Nov. 9, 1965   J. S. GOLIGHTLY   3,216,811

GLASS BENDING

Filed June 30, 1960

INVENTOR.
JAMES S. GOLIGHTLY

BY Oscar L. Spencer
ATTORNEY

United States Patent Office 3,216,811
Patented Nov. 9, 1965

3,216,811
GLASS BENDING
James S. Golightly, Pittsburgh, Pa., assignor to Pittsburgh Plate Glass Company, Pittsburgh, Pa., a corporation of Pennsylvania
Filed June 30, 1960, Ser. No. 40,078
5 Claims. (Cl. 65—107)

This application relates to glass bending, and particularly concerns a method of treating bending molds having a thermal capacity per unit area greater than that of a contacting portion of a glass sheet to be bent thereon in order to reduce breakage of the portion of the glass sheet maintained in continuous contact during the preheat portion of a glass sheet heat-bending operation, and apparatus for performing this method.

Glass sheets are fabricated into automobile windshields and backlights by a heat-bending method in which the glass is mounted on a skeletonized, sectionalized mold whose sections are pivoted relative to each other into a spread mold position for supporting a flat glass sheet for bending and are weighted to move into a closed mold position wherein their upper surfaces provide a substantially continuous skeletonized shaping surface conforming to the shape desired for the bent glass sheet. When the glass sheet is softened by heat, the pivoted mold sections move into a closed mold position and impose their shape on the glass.

When the molds are pivoted into the spread position, the longitudinal end extremities of the endmost mold sections support the undersurface of the glass sheet near its longitudinal extremities and continue to remain in contact with the glass sheet during the entire preheating operation. The present invention recognizes that this continuous glass to metal contact during preheat is a cause of glass breakage and proposes a solution. The mold sections are fabricated of a metal that has a much higher thermal capacity than the contacted portion of glass. Furthermore, the thickness of the glass supported on the mold is on the order of ¼ inch, whereas the thickness of the supporting mold portion in the direction of glass thickness usually varies from about 1½ inches to about 2 inches.

In the past it has been the custom to "condition" bending molds by passing unloaded molds through a bending furnace prior to the first bending cycle. Such conditioning raised the mold temperature to about 200° F. compared to room temperature, about 75° F., for the glass sheets to be bent.

When the glass-laden molds are subjected to the heating operation involved in the glass bending cycle, the difference in thermal capacity between the metal of the mold and the glass causes the glass to be heated at a faster rate than that of the mold. However, the rates of heating the glass sheet and that of heating the bending mold were both sufficiently slow so that the mold reached a sufficiently high temperature to avoid chill cracking the glass.

As the production rates were accelerated, a considerable amount of breakage occurred at the tips of the glass sheets. This was attributed to the fact that the glass tips were continuously in contact with the tips of the metal mold. Accelerating the rate of heating of both the metal and the glass increased the temperature difference between the metal and the glass. Therefore, it was found necessary prior to the present invention to apply some parting material to the shaping surface of the mold to provide insulation between the mold shaping surface and the glass sheet and thereby diminish the effect of the temperature differential that occurred during the bending operation. This application was particularly necessary in those regions where the glass was in continuous contact with the metal mold during the entire preheat portion of the bending cycle.

Such manual operations were found to be time consuming and wasteful. Development of improved parting materials requiring only one application per eight-hour shift did not eliminate completely the necessity for additional labor costs and time consumed for application of the parting material. The present invention provides an improved technique for reducing tip breakage that avoids the need for the labor operations involved in applying a parting material manually.

According to the present invention, the portions of the bending mold with which the glass is in continuous contact throughout the preheat operation are heated to a temperature sufficiently higher than that of the flat glass sheet mounted thereon for bending to compensate for the difference in heating rates between the glass sheet and the metal mold so that the relatively cold metal mold does not chill crack the glass after both are heated during preheating preceding glass bending.

This is accomplished by providing gas burners along the path of movement taken by the above mentioned flat glass contacting portions of the bending molds immediately before the molds reach a glass loading station. These portions are exposed to burning gases which raise their temperature from about 200° F., the temperature of the remainder of the mold, to a temperature in a range of about 370° F. to 400° F., for example, which temperature is sufficient to enable the glass sheet to remain in continuous contact with the metal mold during the heating phase of the bending cycle without having the glass sheet attain a temperature so much higher than that of the metal of the mold in continuous contact therewith as to chill crack the glass.

An illustrative embodiment of the present invention will now be described. The purpose of this description is for illustration rather than limitation. Reference to the latter may be obtained by studying the claimed subject matter accompanying this specification.

In the drawings which form part of the present description and wherein like reference numbers apply to identical structural elements, FIG. 1 is a longitudinal side view of a typical bending lehr including a mold return conveyor;

Figure 1:
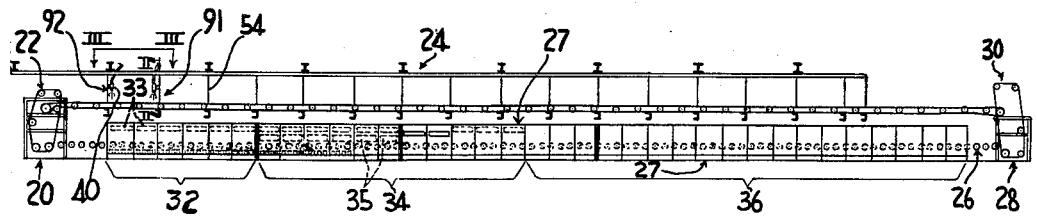

Referring to the drawings, a typical glass bending apparatus comprises a loading station 20 including an elevator conveyor 22 used to lower mold support carriages from a mold return conveyor 24 to the loading station. A roller conveyor 26 extends throughout a tunnel-like lehr 27.

At the exit end of the lehr is an unloading station 28 wherein bent glass sheets are removed from the molds. A lifting conveyor 30 removes the unloaded bending molds and transfers them to the mold return conveyor 24 which is located immediately above and outside the tunnel-like lehr 27.

Lehr 27 comprises a preheat section 32 comprising overhead heaters 33 capable of heating the glass sheet to a temperature approaching its softening point, a bending section 34 comprising additional overhead heaters 33 plus auxiliary heaters 35 so constructed and arranged as to radiate intense bands of heat onto the moving glass sheet so as to localize the areas of most severe bending.

The remainder of lehr 27 is an annealing zone 36 wherein the bent glass sheet is cooled in a controlled manner so as to impart a desirable stress pattern in the bent glass sheet. Since the bending and the annealing operations form no part of the present invention, they are only being mentioned in passing to provide a full disclosure of the apparatus in which the present invention resides.

Near the end of the mold return conveyor 24 adjacent elevator conveyor 22 are mounted a plurality of gas burners 40. The gas burners 40 are mounted in two pairs. Each pair of gas burners comprises a pair of laterally opposed burners 40.

Each of the burners 40 comprises a barrel 41 rigidly attached to a flat plate 42 extending downwardly therefrom. The latter is pivotally mounted to a flat extension 44 of a round rod 46 by means of a lockable pivotable connection 47 pivotally interconnecting plate 42 to extension 44. Round rod 46 is slidably supported in a sleeve 48. A set screw 50 determines the relative position of the round rod 46 in sleeve 48. Each sleeve 48 is rigidly connected by means of a bar 52 to a column 54 of the return conveyor support structure which supports the mold return conveyor 24. Thus, the position of the orifice of the barrel 41 of each gas burner 40 and its orientation relative to the path of movement of each mold extremity along the mold return conveyor 24 can be determined by properly positioning round rod 46 relative to support sleeve 48 and by pivoting flat plate 42 in a desired orientation relative to the flat extension plate 44.

The mold return conveyor 24 provides conveyor means defining a path of movement for conveying a bending mold therealong to the glass loading station 20, the support structure 54 provides support means for supporting the mold return conveyor 24 and each of the gas burners 40.

The latter serve as heating elements. The provision of two pairs of heating elements 40 permits the bending molds to be heated in two locations along the path of movement.

The mold return conveyor 24 comprises a plurailty of laterally spaced stub rolls 60 which support the undersurface of cross rails 62 extending across mold support carriage C upon which are mounted the bending molds M.

Figure 2:
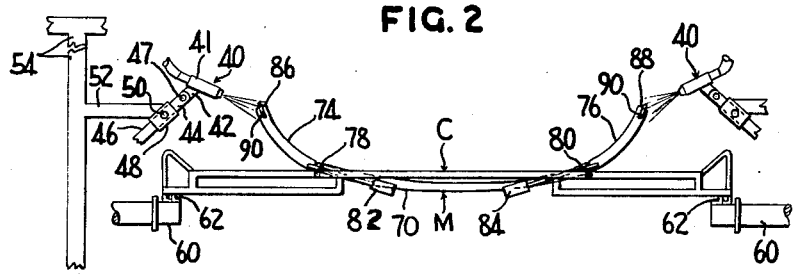
FIG. 2 is a fragmentary sectional view along the lines II—II of FIG. 1 showing how burners are disposed so that their flames intersect the path of movement taken by the longitudinal extremities of the bending molds moving along the path of the conveyor.
Figure 3:
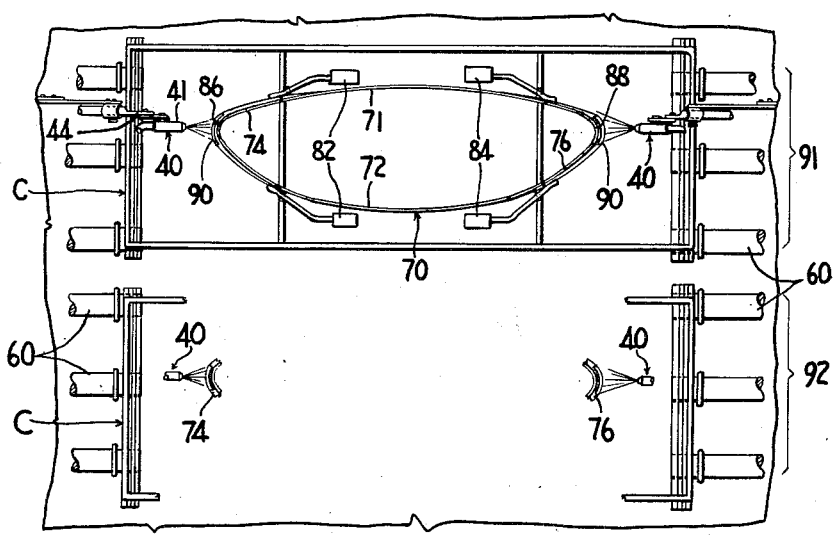
FIG. 3 is a fragmentary plan view of the portion of the mold return conveyor in the area III—III further illustrating the relative positions of the heaters and the longitudinal mold extremities.

The molds are provided with a center mold section 70 in the form of longitudinally extending rails 71 and 72 having upper shaping edges of concave configuration and end members 74 and 76 flanking the center section 70 and pivotally attached thereto by means of pivots 78 and 80. Weight arms 82 and 84 are attached to the end sections 74 and 76, respectively, to provide a rotational force tending to urge the mold into a closed mold position such as depicted in FIGURES 2 and 3. Suitable stops (not shown) which are well known in the art are provided to limit the closing position of the sectionalized mold. Longitudinal end extremity 86 of end mold section 76 and longitudinal end extremity 88 of end mold section 78 each incorporate a ballast member 90.

When glass sheets are bent on a mass production basis, a plurality of bending molds are continuously conveyed through the tunnel-like lehr 27 and returned on the mold return conveyor 24. Thus, the longitudinal end extremities 86 and 88 of end sections 74 and 76 traverse paths of movement whose position can be easily determined and it is merely necessary to adjust the position of the heating elements 40 so that the heat radiated from the heating elements intersects the path of movement taken by the longitudinal extremities 86 and 88 of the mold 70 as the mold traverses the mold treating stations 91 and 92 depicted in plan in FIG. 3.

The mold return conveyor 24 is preferably operated on an intermittent basis so that the longitudinal end extremities 86 and 88 are in alignment with the flame emanating from the heating elements 40 at the mold treating station toward the end of the mold return conveyor 24 adjacent the mold loading station 20.

In a typical operation, an unloaded mold traversing the mold return conveyor 24 from the lifting conveyor 30 toward the elevator conveyor 22 is moved into a position wherein its longitudinal end extremities 86 and 88 are aligned with the heating elements 40 at a first mold treating station 91. Each longitudinal end extremity of the mold is subjected to a blast of burning gas from each heating element of the first pair of heating elements for a period of from 15 to 20 seconds (about 17 seconds, for example) for mold rails ⅛ inch thick and 2 inches wide.

The mold return conveyor 24 moves the mold from between the first pair of laterally opposing heating elements 40 at the first mold treating station 91 to the second pair of laterally opposing heating elements 40 at a second mold treating station 92. A succeeding mold is simultaneously conveyed to the first treating station 91.

Typical mold rails comprise edgewise disposed rails having a thickness of between about ⅛ inch and about 3/16 inch and a height between that of about 1½ inches to about 2 inches. A ballast member in the form of a metal strap ¼ inch thick and ⅛ inch wide is welded to the outer surface of the mold rail at the longitudinal end extremities of each end section 74 and 76. The chemical composition of the mold shaping rails is stainless steel #304 consisting essentially of 18 to 20% by weight of chromium, 8 to 12% by weight of nickel, not more than 2% by weight of manganese, not more than 1% by weight of silicon, not more than 0.8% by weight of carbon and the balance iron.

The flame from each heating element 40 covers a length of 6 to 8 inches at the longitudinal end extremities of the bending mold. The intensity of the heat imparted by the heating elements 40 and the duration of exposure of the critical mold portions thereto is so correlated with the time interval between mold tip heating and mold loading that the critical mold regions in continuous contact with the glass are about 300° F. hotter than the glass loaded thereon. It is understood that this temperature difference is illustrative only of the typical mold and glass dimensions and compositions specified. Other mold rail dimensions and/or other glass thicknesses would require different temperature compensations for the flat glass contacting portions of the mold depending on the relative heating rates of the glass sheet and the metal mold rail.

The employment of gas burners to heat the mold tips in the manner described above has elevated the temperatures at the longitudinal extremities of the bending mold from 200° F., the temperature of the mold after "conditioning," to between 370° F. and 400° F. and has resulted in complete elimination of glass tip breakage resulting from chill cracking during the bending operation without requiring the application of parting materials to serve as insulation between the longitudinal end extremities of the bending mold and the portions of the flat glass sheet slidably supported thereon throughout the bending cycle.

While the description of an illustrative embodiment of the present invention has described apparatus for heating the mold tips, it is equally within the purview of the present invention to provide means outside the bending lehr to selectively heat any portion of the bending mold that is likely to chill crack a flat glass sheet during the preheat portion of the bending cycle.

What is claimed is:

1. A method of bending a glass sheet wherein a portion of said glass sheet is maintained in continuous contact with a metal bending mold, having substantially higher thermal capacity than that of glass, during a glass sheet heat-bending operation, comprising selectively heating the portion of the mold with which said glass sheet portion is to be in continuous contact during the preheating portion of the bending operation to a higher temperature than that of the remainder of the mold just before loading a relatively cold flat glass sheet thereon for bending, the elevated temperature being sufficiently higher than that of the flat glass sheet mounted thereon for bending to compensate for the differences in rates of heating the relatively cool glass sheet and the relatively hot metal portion in contact therewith simultaneously so that the temperature of the glass contacting portion of the mold attains a temperature sufficiently high to avoid chill cracking the supported glass sheet portion when the glass sheet is preheated preceding its bending while supported on said mold.

2. A method according to claim 1, wherein the mold is concave in elevation and the only portion of the mold heated to a higher temperature than that of the remainder of the mold is located at its longitudinal end extremities.

3. A method as in claim 1 including selectively heating the portion of the mold with which the supported flat glass sheet remains in continuous contact during the heating portion of the bending cycle to a minimum temperature about 300° F. above that of the flat glass sheet, said minimum temperature of said heated mold portion being greater than that of the remainder of the mold, mounting the glass sheet on the bending mold while such minimum temperature differential remains and immediately thereafter subjecting the glass laden mold to the heating portion of the bending cycle.

4. A method according to claim 1, wherein said selective heating is accomplished by exposing to burning gases said portion of the mold with which said glass sheet portion is to be in continuous contact during the preheating portion of the bending operation.

5. In apparatus for bending glass sheets comprising a tunnel-like lehr, a conveyor extending longitudinally therethrough, bending molds supported for movement through said bending lehr along said conveyor, an entrance at one end of said lehr, an exit at the other end of said lehr, and a return conveyor located outside said lehr and extending between said exit and said entrance for returning unloaded glass sheet bending molds from said exit to said entrance, the improvement comprising heating elements located in positions along said return conveyor and adjacent said entrance and oriented to direct intense heat toward regions along the path of movement taken by localized portions only of the bending molds which contact a glass sheet supported thereon for bending during the preheat portion of the entire bending cycle, said return conveyor being free of any heating elements capable of directing heat onto portions of the bending molds other than said localized portions.

References Cited by the Examiner
UNITED STATES PATENTS 2,137,115    11/38    Marshall _____ 65—169
2,794,300    6/47    Golightly _____ 65—158

DONALL H. SYLVESTER, *Primary Examiner.*

CHARLES R. HODGES, MORRIS O. WOLK,
                                              *Examiners.*